United States Patent
Marshall et al.

(10) Patent No.: US 8,689,214 B2
(45) Date of Patent: Apr. 1, 2014

(54) REPLICATION OF MACHINE INSTANCES IN A COMPUTING ENVIRONMENT

(75) Inventors: Bradley E. Marshall, Bainbridge Island, WA (US); Swaminathan Sivasubramanian, Seattle, WA (US); Tate Andrew Certain, Seattle, WA (US); Nicholas J. Maniscalco, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 291 days.

(21) Appl. No.: 13/070,812

(22) Filed: Mar. 24, 2011

(65) Prior Publication Data
US 2012/0246640 A1 Sep. 27, 2012

(51) Int. Cl.
G06F 9/455 (2006.01)
G06F 11/00 (2006.01)
G06F 9/44 (2006.01)

(52) U.S. Cl.
USPC .............. 718/1; 714/45; 714/46; 714/47.1; 714/48; 714/49; 714/50; 717/127; 717/128; 717/130; 717/131; 717/124

(58) Field of Classification Search
None
See application file for complete search history.

(56) References Cited

U.S. PATENT DOCUMENTS

| | | | | |
|---|---|---|---|---|
| 5,157,779 A * | 10/1992 | Washburn et al. | | 714/37 |
| 7,840,787 B2 | 11/2010 | De Pauw et al. | | |
| 7,966,615 B2 * | 6/2011 | Venkitachalam et al. | | 718/1 |
| 8,464,250 B1 * | 6/2013 | Ansel | | 718/1 |
| 2008/0028402 A1 | 1/2008 | Senoo | | |
| 2008/0168427 A1 * | 7/2008 | Bestgen et al. | | 717/128 |
| 2009/0320011 A1 * | 12/2009 | Chow et al. | | 717/154 |
| 2010/0107158 A1 | 4/2010 | Chen et al. | | |
| 2011/0264787 A1 * | 10/2011 | Mickens et al. | | 709/224 |
| 2012/0054715 A1 * | 3/2012 | Welchman et al. | | 717/106 |
| 2012/0174069 A1 * | 7/2012 | Zavatone | | 717/124 |
| 2012/0198448 A1 * | 8/2012 | Cervantes et al. | | 718/1 |
| 2012/0239987 A1 * | 9/2012 | Chow et al. | | 714/49 |

OTHER PUBLICATIONS

International Search Report and Written Opinion, dated Jun. 20, 2012 for PCT/US 2012/029787.

* cited by examiner

*Primary Examiner* — Abdullah Al Kawsar
(74) *Attorney, Agent, or Firm* — Thomas Horstemeyer, LLC

(57) ABSTRACT

Disclosed are various embodiments for replication of machine instances in a computing environment. A clone machine instance is instantiated from a machine image associated with an original machine instance. A stored execution state of the original machine instance is applied to the clone machine instance. At least a portion of a series of stored events received by the original machine instance is applied to the clone machine instance.

20 Claims, 3 Drawing Sheets

REPLICATION OF MACHINE INSTANCES IN A COMPUTING ENVIRONMENT

A system crash (i.e. "crash") in computing is a condition in which a computer or a program, either an application or part of the operating system, ceases to function properly, often resulting in the system being unusable. When computing systems undergo crashes, the user of the machine may have the option of rebooting the computer and/or restarting the applications that were being executed. However, in doing so, the user may lose information about events that led up to the crash, thus hampering the ability to determine what caused the crash. The user may have another option, which is keeping the virtual machine offline or otherwise out of service such that events that led up to the crash can be examined. However, keeping the computing system out of service can have a negative impact on the user's productivity.

Various forms of shared computing resources have been implemented. As one example, a shared computing resource may include multiple networked computing devices executing instances of virtual machines, where each of these virtual machines are associated with a particular user. These users may be, for example, customers of a utility computing service. Each virtual machine may execute one or more applications, such as a web server, video encoder, load balancer, or database, among many other possibilities. The users may be capable of terminating machine instances or starting execution of new machine instances whenever they desire, sometimes incurring costs only for the time that they actually use the machine instance. This model thereby provides an elastic computing resource.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to replicating machine instances in a shared computing environment. The systems and methods can be used, among other reasons, to facilitate troubleshooting of computing system failures or computing anomalies. According to some embodiments, a clone machine instance is created from an original machine instance. The machine image of the original machine instance is used to create this clone, resulting in a copy of the original machine instance as it existed at boot time. The state of the clone machine instance is then moved forward in time by first applying a snapshot of the execution environment of the original machine instance as it existed at a particular point in time after boot time. The state of the clone machine instance is then moved forward again in time by applying to the clone machine instance the same inputs seen by the original machine instance during a particular period of time. These inputs may include transactions with a virtual block device (e.g., read, write, etc.), network traffic, and possibly other types of inputs.

In some embodiments an interface is provided to allow the user to control execution of the clone machine instance. This interface may allow the user to select different snapshots managed by the user and different series of inputs. This interface may allow the user to choose specific types of inputs to be applied. In the following discussion, a general description of the system and its components is provided, followed by a discussion of the operation of the same.

Figure 1:
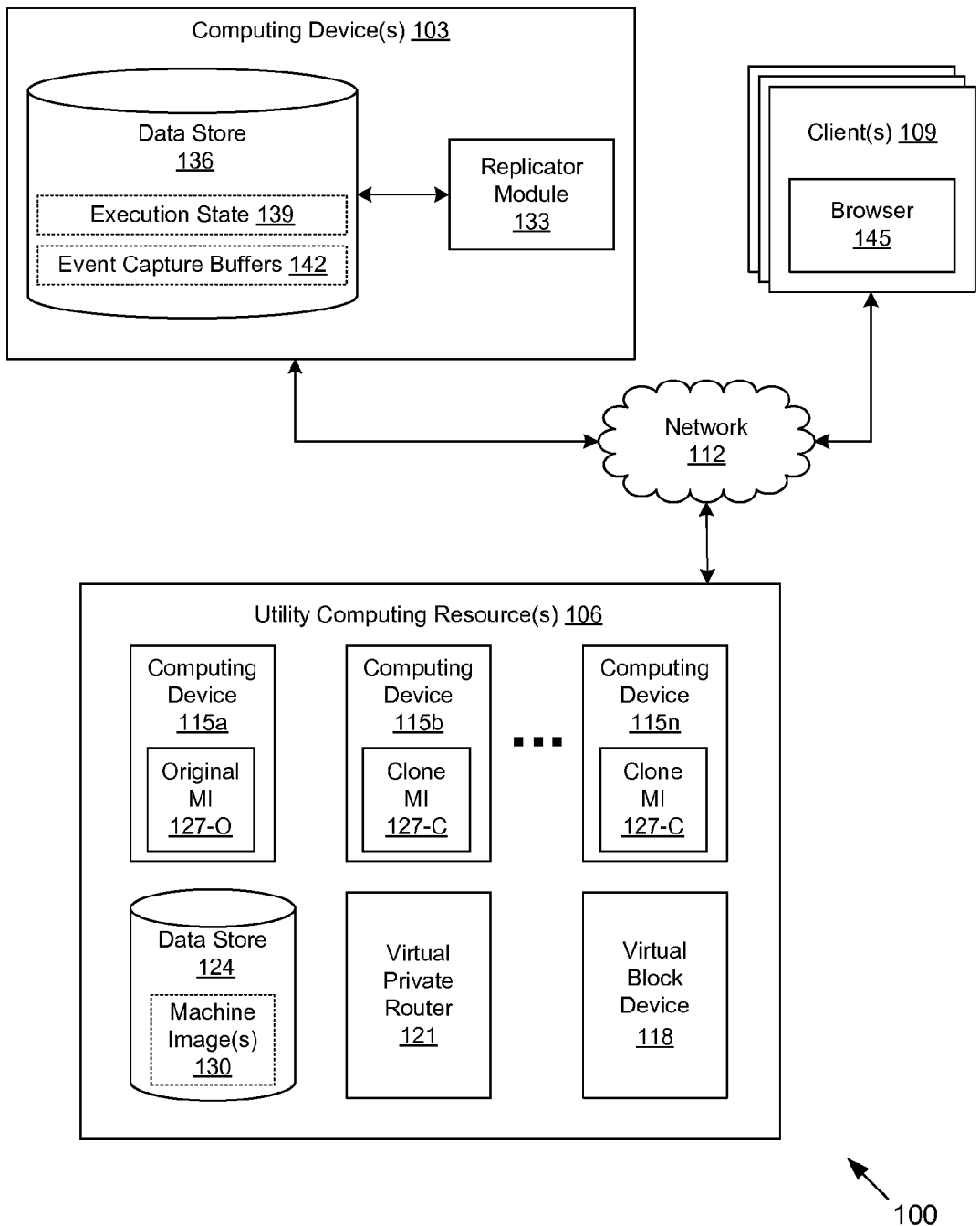
FIG. 1 is a drawing of a networked environment according to various embodiments of the present disclosure.

With reference to FIG. 1, shown is a networked environment 100 according to various embodiments. The networked environment 100 includes one or more computing devices 103, one or more utility computing resources 106, and one or more clients 109 in data communication by way of a network 112. The network 112 includes, for example, the Internet, intranets, extranets, wide area networks (WANs), local area networks (LANs), wired networks, wireless networks, or other suitable networks, etc., or any combination of two or more such networks.

The utility computing resource 106 includes a plurality of computing devices 115a ... 115n, at least one virtual block device 118, a virtual private router 121, and a data store 124. Such components of the utility computing resource 106 may be in data communication with each other and/or the computing device 103 by way of a network such as network 112. Such components of the utility computing resource 106 may be located in a single location (e.g. a building or cluster of buildings) or may be dispersed among many different geographical locations. Computing devices 115a ... 115n may correspond to differing hardware platforms in various embodiments. Accordingly, computing devices 115a ... 115n may have differing hardware configurations, for example, of central processing units (CPUs), system memory, data storage, network bandwidth, and/or other hardware characteristics.

Each computing device 115a ... 115n may execute one or more machine instances (MI) 127, where a machine instance 127 corresponds to an actual physical machine or to a virtual machine. In the example of FIG. 1, an original machine instance 127-O is executed on computing device 115a while a clone machine instance 127-C is executed on computing device 115b. However, in other embodiments, original machine instance 127-O and clone machine instance 127-C execute as virtual machines on the same computing device 115a ... n.

A virtual machine instance 112 is a virtualized computer system, or a software implementation of a computer system layered on top of a physical computing system, such as through a hypervisor. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single computer system. Each machine instance may be controlled by different users, who may have administrative access only to their own instance(s) and no access to the instances of other users. Multiple machine instances may, in fact, execute concurrently on a computer system including parallel processors, although multiple instances may appear to execute concurrently on a multithreaded computer system with fewer processors than instances. In some cases, different machine instances run on a particular physical computing device 115 are controlled by two or more different users, while in other cases all of the machine instances are controlled by a single user.

Various applications and/or other functionality may be executed in the computing devices 115a . . . 115n according to various embodiments. Also, various data is stored in the data store 124 that is accessible to the computing devices 115a . . . 115n. The data store 124 may be representative of a plurality of data stores as can be appreciated. The data stored in the data store 124, for example, is associated with the operation of the various applications and/or functional entities described herein. The data stored in the data store 124 may include, for example, one or more machine images 130 used to start the execution of a machine instance 127. A machine image 130 includes one or more disk images of an operating system environment and may include additional software such as web servers, databases, load balancers, caches, among other possible application software possibilities.

In addition to the storage provided by the data store 124, one or more of the machine instances 127 may utilize a virtual block device 118 for storage. A virtual block device 118 appears to the machine instance 127 as a local block level device (e.g., an attached disk drive) but that can be attached to and unattached from the instance through a network. The virtual block device 118 may be implemented, for example, by one or more server computers with a disk drive or other block level data storage device, by a storage area network (SAN), or by any other system which provides storage capability and the appropriate virtual interface.

As discussed previously, the computing devices 115a . . . 115n which make up the utility computing resource 106 are attached to the network 112, which allows communication among computing devices 103, clients 109, and utility computing resources 106. In addition, network 112 can facilitate communications among individual components within these entities, such as among computing devices 115a-n. Although network 112 may include a number of physical networking devices (e.g. routers, switches, aggregators, etc.), a virtual private router 121 may further provide a virtual network overlay on top of the network 112. This virtual network overlay may be user-specific. With a user-specific virtual network overlay in place, machine instances 127 inside the utility computing resource 106 that are associated with a particular user appear to be in the same IP network as computing entities outside the utility computing resource 106 that are associated with the same user. The virtual private router 121 may be implemented, for example, by a router, a switch, a server computer with a network interface, or by any other computing system with a network interface and appropriate network overlay functionality. The virtual network overlay allows manipulation of network traffic so that two machines, or machine instances, can appear to use the same IP address. The virtual network overlay distinguishes between the two in order to deliver packets to the correct machine instance, using packet wrapping, tunneling techniques, or other approaches.

Turning now from the utility computing resource 106 to the computing device 103, the computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other utility computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. The components executed on the computing device 103, for example, include a replicator module 133, and may also include other applications, services, processes, systems, engines, or functionality not discussed in detail herein. The replicator module 133 is executed to clone or replicate machine instances. In doing so, the replicator module 133 reproduces the state of an original machine instance 127-O as it existed at a particular point in time on a clone machine instance 127-C. The replicator module 133 is further executed to take inputs which were received at the original machine instance 127-O and to apply those inputs to the clone machine instance 127-C such that the execution of the clone machine instance 127-C moves forward in time from the snapshot of the particular point in time.

In the embodiment illustrated in FIG. 1, the computing device 103 which executes the replicator module 133 is separate from, but in communication with, the utility computing resource 106. In other embodiments (not shown), the computing device 103 resides within the utility computing resource 106.

Various data is stored in a data store 136 that is accessible to the computing device 103. The data stored in the data store 136 includes, for example, execution state 139, one or more event capture buffers 142, and potentially other data which is associated with the operation of the replicator module 133. The data store 136 may be representative of a plurality of data stores as can be appreciated.

Turning now from the computing device 103 to the client 109, the client 109 is representative of a plurality of client devices that may be coupled to the network 112. The client 109 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other devices with like capability.

The client 109 may utilize web services to interact with the utility computing resource 106. These web services may be implemented via a variety of middleware frameworks, such as remote procedure calls, service-oriented architecture (SOA), representational state transfer (REST), and other frameworks. The client 109 may be configured to execute various applications such as a browser 145 and/or other applications. The browser 145 may be executed in a client 109, for example, to access and render network pages, such as web pages, or other network content served by the computing device 103 and/or other servers. The client 109 may be configured to execute applications beyond browser 145 such as, for example, email applications, instant message applications, and/or other applications.

Next, a general description of the operation of the various components of the networked environment 100 is provided. To begin, a user at a client 109 configures one or more machine instances (MI) 127 for execution within the utility computing resource 106. The initiation of the execution of the machine instances 127 may be performed manually (e.g. through a browser or other user interface) by the user or programmatically. In configuring a machine instance 127, the user may specify a particular machine image 130 which can include a desired operating system and, potentially, one or more applications). Further, the configuring can include specifying a desired hardware platform (e.g. having a particular chipset, processor speed, memory size, etc.). In executing, the machine instances 127 thereby use computing resources of the utility computing resource 106.

The user initiates replication, or cloning, of an original machine instance 127-O by interacting (manually or programmatically) with the replicator module 133. As will be further described below, this replication performed by the replicator module 133 allows a user to investigate any sort anomalous behavior by "replaying," on the clone machine instance 127-C, activity leading up to the anomalous behavior of the original machine instance 127-O. Such anomalous behavior may include, for example, an unresponsive system, a system that returns unexpected data, a crash, etc. The replication also enhances testing by allowing the user to execute the original machine instance 127-O, and then perform a series of replications, advancing the clone machine instance 127-C to a different execution state each time.

The replicator module 133 associates each replica or clone with a replay buffer size and/or snapshot period. For example, a clone machine instance 127-C may be configured to take a snapshot of the original machine instance's 127-O execution state every five minutes, and then to buffer for five minutes after the snapshot. The replay buffer may include any events which originate from outside the original machine instance 127-O and interact with the original machine instance 127-O, for example, local and remote storage device transactions, network traffic, and environmental information. When the event data includes environmental information, environmental sensors associated with the original machine instance 127-O can be used to record the environmental information such as, but not limited to, temperature, humidity, vibration, voltage and/or current supplied to various computing components hosting the original image. The events that trigger the recording of this information can be, for example, periodic samples or samples triggered by alarms. Thus, if the original machine instance 127-O crashes, the replicator module 133 can replay activity before the crash, up to five minutes. In some embodiments multiple clones can be used with staggered snapshot periods, for example, a first clone is created using a snapshot taken at time t, a second clone is created using a snapshot at t+5 minutes, a third clone is created using a snapshot at t+10 minutes, etc. Multiple clones also be created with different replay sizes, for example, a first clone is created from a snapshot at time t using a 5 minute replay buffer, and a second clone is also created at time t but using a 10 minute replay buffer.

In some embodiments, the clone machine instance 127-C utilizes the same IP address as the original machine instance 127-O. As noted above, the virtual network overlay takes care of distinguishing between the two machine instances and ensuring delivery to the correct machine instance. This capability, coupled with the replay buffer, allows the original machine instance 127-O to continue executing and to continue to send/receive network traffic while the clone machine instance 127-C simultaneously receives virtual network traffic destined for the same address from the capture buffer.

The replicator module 133 may provide an event control interface that allows the user to start and stop replay of events into the clone by specifying particular timestamps or ranges of timestamps. In some embodiments, this event control interface allows the user to select a different snapshot from which to start execution by specifying a particular time at which the snapshot was taken. This interface may be programmatic or may be a graphical user interface.

Figure 2:
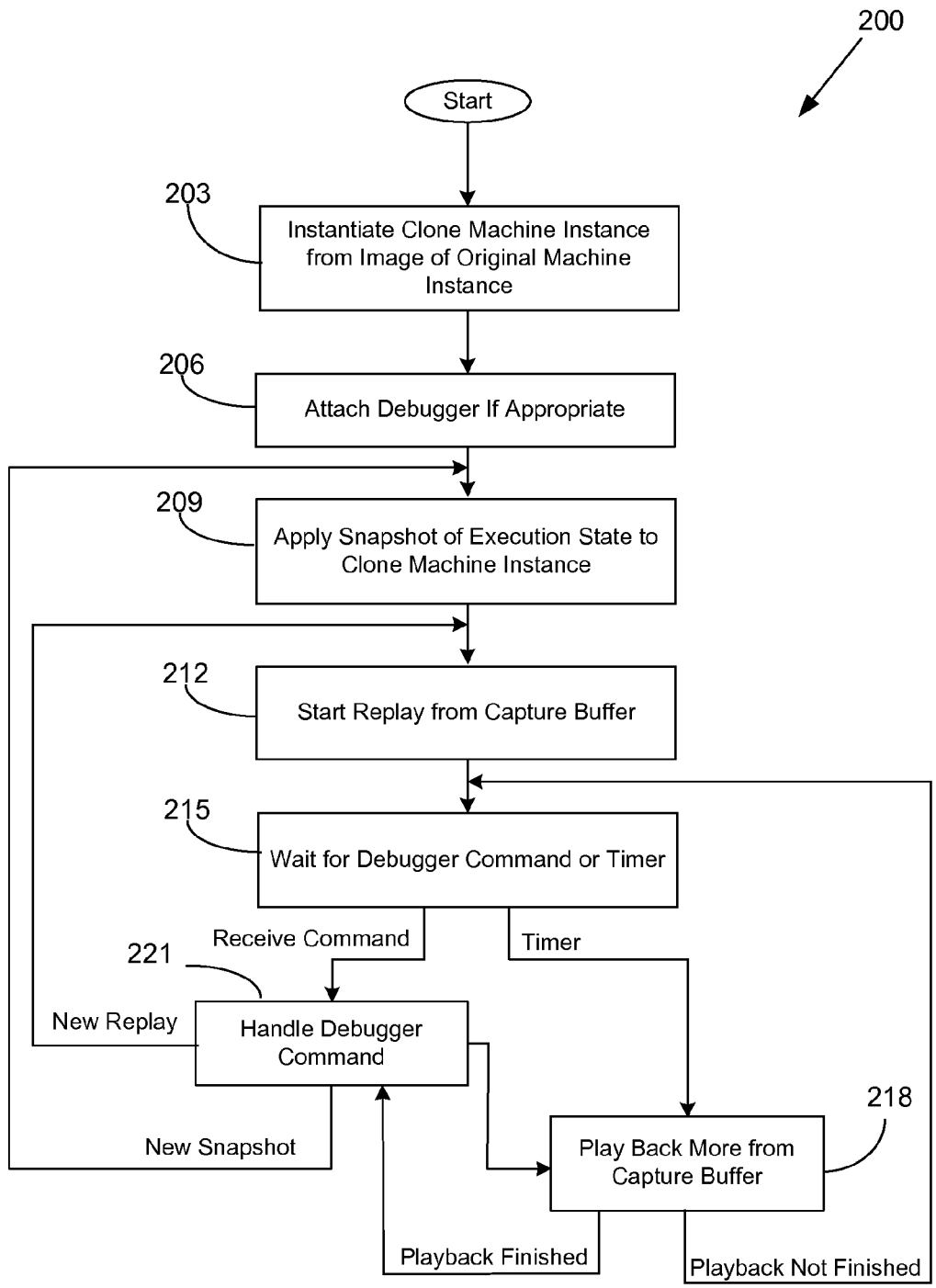
FIG. 2 is a flowchart illustrating one example of functionality implemented as portions of a replicator module executed in a computing device in the networked environment of FIG. 1 according to various embodiments of the present disclosure.

Referring next to FIG. 2, shown is a flowchart that provides one example of the operation of a portion of the replicator module 133 (FIG. 1) according to various embodiments. It is understood that the flowchart of FIG. 2 provides merely an example of the many different types of functional arrangements that may be employed to implement the operation of the portion of the replicator module 133 as described herein. As an alternative, the flowchart of FIG. 2 may be viewed as depicting an example of steps of a method implemented in the computing device 103 (FIG. 1) according to one or more embodiments.

The process 200 of FIG. 2 begins with block 203, the replicator module 133 instantiates a clone machine instance 127-C from the machine image 130 used to instantiate a corresponding original machine instance 127-O (FIG. 1). As mentioned above, a machine image 130 is a stored image of an operating system, sometimes also including a particular set of software applications. In some embodiments, the instantiation in block 203 creates a virtual machine and boots the virtual machine from the machine image 130. In other embodiments, the instantiation in block 203 reserves or allocates a physical machine and boots the physical machine from the machine image 130. In either case, the result is the particular machine instance 127-C, which is a clone of the original machine instance 127-O as it existed at boot time.

In block 206, the replicator module 133 examines configuration settings and attaches a debugger to the clone machine instance 127-C, if the settings so indicate. These configuration settings may be provided by the user through a client 109 (FIG. 1) (e.g., via a web services call, a network page, etc.), or may be default settings.

Next, in block 209, the replicator module 133 accesses execution state 139 in data store 136, which represents a snapshot of the execution state of the original machine instance 127-O at a particular point in time. The replicator module 133 applies the execution state 139 (FIG. 1) to the clone machine instance 127-C, thus setting the execution state of the clone machine instance 127-C to the time the snapshot was taken. In some embodiments, this may be the most recent snapshot of the execution state. In other embodiments, if multiple snapshots are available, one snapshot is selected through the event controller interface described above.

The execution state 139 includes at least the contents of the memory of the original machine instance 127-O and the register contents of the processor of the original machine instance 127-O at the time of the last snapshot. The execution state 139 may also include the contents of block devices locally attached to original machine instance 127-O. The execution state 139 may also include the storage state of one or more virtual block devices that are remotely accessible to the original machine instance. The execution state 139 may have been stored by replicator module 133 or by another module.

In block 212, the replicator module 133 accesses an event capture buffer 142 (FIG. 1) in data store 136, which contains a series of inputs or events received by the original machine instance 127-O after the snapshot. The event capture buffer 142 may have been stored by replicator module 133 or by another module. The replicator module 133 begins applying, or "playing back," some or all of the stored events to the clone machine instance 127-C. The individual events include timestamps, and the replicator module 133 may use these timestamps during playback to maintain the same timing relationship between events that was present at the time the events were captured. The replicator module 133 may also use these timestamps during playback to alter the timing, such that playback occurs slower than, or faster than, the original events. The playback in block 212 may occur in response to programmatic or user input through the event controller interface described above, or may occur automatically after the application of the execution state in block 209.

The number of events applied to the clone machine instance 127-C may be determined based on criteria supplied through the event controller interface. As one example, a criterion may specify that five minutes of the event capture buffer 142, or other time period, are played back. As another example, a criterion may specify that 33% of the event capture buffer 142, or other percentage, is played back. In some embodiments, the user may also specify which portion of the event capture buffer 142 is to be applied. The portion of the event capture buffer 142 may be, for example, the first five minutes of a buffer, or the middle third of a buffer, or some other portion. In some embodiments multiple capture buffers 142 are stored according to different configuration data. For example, the events may be included or excluded based on where the events originate from (e.g. a device, an IP address, etc.), a time they are received, the type of event, or a user from which the events are received, among other examples.

Since the original machine instance 127-O executes in the environment of the utility computing resource 106 (FIG. 1), the events applied can include virtual block device transactions between the original machine instance 127-O and the virtual block device 118, and/or virtual network traffic between the original machine instance 127-O and the virtual private router 121. In some embodiments, the input events are restricted and do not include keystrokes, mouse movements, or other forms of user input, since the environment of the utility computing resource 106 is sometimes restricted in this manner. Some embodiments of the replicator module 133 allow specified types of events to be selectively included or excluded from playback to the clone machine instance 127-C. In one example, only virtual block device transactions are applied to the clone machine instance 127-C. In another example, virtual block device transactions are excluded from playback. In yet another example, only those virtual block device transactions which involve a specific device are applied. In yet another example, only virtual network traffic involving a particular source or destination address is applied. In addition to excluding some events, in some embodiments, entropic events can be injected into the events in order to observe how the cloned machine instance 127-C behaves. For example, various events (e.g. network traffic, hard drive failure events, etc.) may be applied at random times in conjunction with the original event data.

In some embodiments, the event capture buffer 142 used for playback may be the buffer with the most recent events. In other embodiments, if multiple capture buffers are available, one buffer can be selected based on criteria selected by the user associated with the original machine instance 127-O. In this way, a user can select from among various buffers that contain desired event data.

Once playback from the event capture buffer 142 has begun, the replicator module 133 waits at block 215 for a periodic timer or receipt of a debugger command. Although an event-driven model will now be described for buffer playback and debugger commands, a polling mechanism is also possible, as should be appreciated. On expiration of a periodic timer, the replicator module 133 moves to block 218. In block 218, the replicator module 133 plays back the next portion of the event capture buffer 142. If that portion is not the last, the replicator module 133 moves to block 215 to await another command or timer expiration. However, if this is the last portion of the buffer (playback is finished), the replicator module 133 moves to block 221.

When a debugger command is received, the replicator module 133 handles the command in block 221. Such handling may involve traditional debugger functions such as starting, stopping, or pausing execution of the clone machine instance 127-C. In addition, the replicator module 133 may provide more functions than those of a traditional debugger. For example, the replicator module 133 may allow the user to select a different snapshot from which to restart execution, to select a different portion of the capture buffer for playback, or to select a different capture buffer altogether. If the command handling involves starting from a different snapshot, the replicator module 133 continues processing at block 209. If the command handling involves starting from a different snapshot, the replicator module 133 continues processing at block 212. Otherwise, the replicator module 133 moves to block 218, where the next portion of the capture buffer is played back.

The embodiment described in connection with FIG. 2 utilizes a capture buffer and replays events from this capture buffer. However, other embodiments create a clone machine instance 127-C and then apply a snapshot of the execution state 139 to the clone machine instance 127-C, but do not store events to, or replay events from, a capture buffer. Even without a capture buffer, the cloning of an original machine instance 127-O allows forensic analysis to be performed while the original machine instance 127-O continues execution or is rebooted/restarted.

Figure 3:
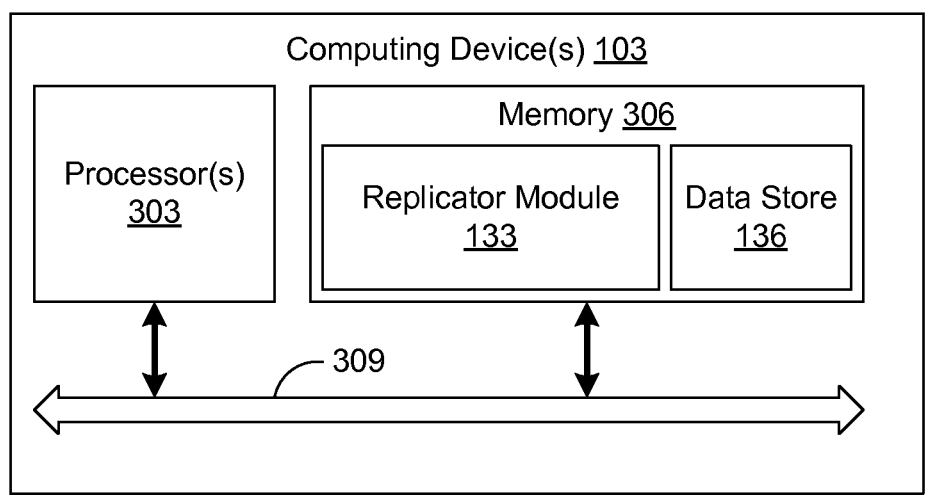
FIG. 3 is a schematic block diagram that provides one example illustration of a computing device employed in the networked environment of FIG. 1 according to various embodiments of the present disclosure.

With reference to FIG. 3, shown is a schematic block diagram of the computing device 103 according to an embodiment of the present disclosure. The computing device 103 includes at least one processor circuit, for example, having a processor 303 and a memory 306, both of which are coupled to a local interface 309. To this end, the computing device 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are a replicator module 133 and potentially other applications. Also stored in the memory 306 may be a data store 136 and other data. In addition, an operating system may be stored in the memory 306 and executable by the processor 303.

It is understood that there may be other applications that are stored in the memory 306 and are executable by the processors 303 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network 112 (FIG. 1) that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although replicator module 133 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of environment 100. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including replicator module 133, that comprises software or code can be embodied in any non-transitory computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
  code that, in response to a first customer request received via a web services application programming interface operated by a service provider, stores an execution state of an original virtual machine instance, the execution state corresponding to a specific point in time;

code that stores a series of timestamped events received by the original virtual machine instance after the specific point in time;

code that receives a second customer request via the web services application programming interface, the second customer request indicating a time period and a request to run a clone virtual machine instance of the original virtual machine instance for the time period;

code that determines that the time period indicated in the second customer request includes a portion of the stored series of timestamped events of the original virtual machine instance stored after storing the state at the specific point in time;

code that instantiates, in response to the second customer request, the clone virtual machine instance using a machine image from which the original virtual machine instance was instantiated, wherein instantiating the clone virtual machine instance includes applying the stored execution state of the original virtual machine instance at the specific point in time to the clone virtual machine instance initiated from the image of the original virtual machine image and applying timestamped events from the stored series of timestamped events prior to the beginning of the requested time period to move the state of the clone virtual machine instance forward in time to the beginning of the requested time period.

2. The non-transitory computer-readable medium of claim 1, wherein the stored series of timestamp events are stored in a capture buffer, and further comprising code that selects the portion of the series of timestamped events relative to a size of the capture buffer.

3. The non-transitory computer-readable medium of claim 1, further comprising code that instantiates another clone virtual machine instance in response to the second customer request.

4. A system, comprising:
one or more computer systems configured to implement a web service, the web service exposing an application programming interface;
at least one computing device; and
a replicator executable in the at least one computing device, the replicator comprising:
logic that, in response to a first customer request received via a web services application operated by a service provider, stores an execution state of an original machine instance, the execution state corresponding to a specific point in time;
logic that stores a series of timestamped events received by the original virtual machine instance after the specific point in time;
logic that receives a second customer request via the web services application programming interface, the second customer request indicating a time period and a request to run a clone virtual machine instance of the original machine instance for the time period;
logic that determines that the time period indicated in the second customer request includes a portion of the stored series of timestamped events of the original machine instance stored after storing the state at the specific point in time;
logic that creates a clone virtual machine instance in response to the second customer request, the clone virtual machine instance is created using a machine image from which the original machine instance was instantiated, wherein instantiating the clone virtual machine instance includes applying the stored execution state of the original machine instance at the specific point in time to the clone virtual machine instance initiated from the image of the original virtual machine image and applying timestamped events from the stored series of timestamped events prior to the beginning of the requested time period to move the state of the clone virtual machine instance forward in time to the beginning of the requested time period.

5. The system of claim 4, wherein the series of stored events comprises network traffic and a block device transaction.

6. The system of claim 5, wherein the network traffic comprises traffic to or from the original machine instance.

7. The system of claim 4, wherein the stored series of timestamped events comprises environment information specified by the second request.

8. The system of claim 4, wherein the original machine instance comprises a virtual machine.

9. The system of claim 4, wherein the execution state includes a memory state of the original machine instance and a register state of a processor of the original machine instance.

10. The system of claim 4, wherein the execution state includes a storage state of block device accessible to the original machine instance.

11. A computer-implemented method, comprising:
storing, via a computer, an execution state of an original machine instance corresponding to a specific point in time in response to a first customer request received by a web service via a representational state transfer (REST) protocol;
storing, via the computer, a series of timestamped events received by the original machine instance after the specific point in time;
determining, via the computer, a time period indicated in a second customer request includes a portion of the stored series of timestamped events of the original machine instance stored after storing the state at the specific point in time;
instantiating, via the computer, a clone machine instance from a machine image associated with the original machine instance, in response to the second customer request received by the web service via the REST protocol, wherein the second customer request indicates the time period and a request to run the clone machine instance for the time period;
applying, via the computer, the stored execution state of the original machine instance at the specific point in time to the clone machine instance initiated from the image of the original virtual machine image and applying to the clone machine instance at least a portion of the stored series of timestamped events received by the original machine instance prior to the beginning of the requested time period to move the state of the clone virtual machine instance forward in time to the beginning of the requested time period.

12. The method of claim 11, wherein the stored series of timestamped events includes at least one of a block device transaction, network traffic, or environment information.

13. The method of claim 11, further comprising:
injecting an entropic event into the stored series of timestamped events; and
applying the entropic event to the clone machine instance in addition to applying the portion of the series of stored events received by the original machine instance.

14. The method of claim 11, further comprising pausing application of the portion of the series of stored events in response to receiving a third request by the web service via the REST protocol.

15. The method of claim 11, wherein applying the portion of the stored series of timestamped events received by the original machine instance comprises selectively excluding some of the stored series of timestamped events from being applied, wherein the selectively excluded stored series of timestamped events are specified in the request.

16. The method of claim 11, wherein the request comprises a first request and the method further comprises:

instantiating, via the computer, a second clone machine instance from the machine image associated with the original machine instance in response to receiving a third request by the web service via the REST protocol;

applying, via the computer, a second stored execution state of the original machine instance to the second clone machine instance, wherein the second stored execution state is specified in the third request; and applying to the second clone machine instance, via the computer, at least one of another stored series of timestamped events received by the original machine instance.

17. The method of claim 11, further comprising-selecting the stored execution state from a plurality of stored execution states.

18. The method of claim 11, further comprising selecting the portion of the stored series of timestamped events from a plurality of series of stored events.

19. The method of claim 11, wherein the original machine instance is a virtual machine and the machine image associated with the original machine instance is a virtual machine image.

20. The method of claim 11, wherein the execution state includes a memory state of the original machine instance and a register state of a processor of the original machine instance.

* * * * *

UNITED STATES PATENT AND TRADEMARK OFFICE
CERTIFICATE OF CORRECTION

PATENT NO. : 8,689,214 B2  
APPLICATION NO. : 13/070812  
DATED : April 1, 2014  
INVENTOR(S) : Bradley E. Marshall et al.

Page 1 of 1

It is certified that error appears in the above-identified patent and that said Letters Patent is hereby corrected as shown below:

In the Claims

Column 11, line 13, after "time;" add --and--

Column 11, line 60, after "time;" add --and--

Column 11, line 61, delete "a" and replace with --the--

Column 12, line 44, after "period;" add --and--

Column 12, line 49, delete "a" and replace with --the--

Signed and Sealed this  
Twenty-third Day of September, 2014

Michelle K. Lee  
*Deputy Director of the United States Patent and Trademark Office*